United States Patent

Nyman et al.

[11] Patent Number: 6,083,400
[45] Date of Patent: Jul. 4, 2000

[54] METHOD AND APPARATUS FOR RECIRCULATING A HEAVIER SOLUTION FROM THE SEPARATION PART OF TWO SEPARABLE SOLUTIONS INTO A MIXING UNIT

[75] Inventors: Bror Nyman, Vanha-Ulvila; Launo Lilja; Stig-Erik Hultholm, both of Pori; Juhani Lyyra; Raimo Kuusisto, both of Espoo; Petri Taipale, Vantaa, all of Finland; Timo Saarenpää, Providencia, Chile

[73] Assignee: Outokumpu Technology Oyj, Finland

[21] Appl. No.: 09/171,597

[22] PCT Filed: Apr. 29, 1997

[86] PCT No.: PCT/FI97/00252

§ 371 Date: Mar. 16, 1999

§ 102(e) Date: Mar. 16, 1999

[87] PCT Pub. No.: WO97/40900

PCT Pub. Date: Nov. 6, 1997

[30] Foreign Application Priority Data

Apr. 30, 1996 [FI] Finland ..................................... 961831

[51] Int. Cl.[7] ................................................. B01N 11/04
[52] U.S. Cl. ......................................... 210/634; 210/511
[58] Field of Search ....................... 210/634, 511

[56] References Cited

U.S. PATENT DOCUMENTS

| | | | |
|---|---|---|---|
| 2,308,755 | 1/1943 | Stratford | 210/511 |
| 2,799,645 | 7/1957 | Musgrove | 210/511 |
| 3,752,758 | 8/1973 | Hindi et al. | 210/511 |
| 4,338,285 | 7/1982 | Eberts | 210/511 |
| 4,747,948 | 5/1988 | North | 210/511 |
| 4,954,260 | 9/1990 | Ludmer et al. | 210/511 |
| 5,185,081 | 2/1993 | Nyman et al. | 210/511 |

Primary Examiner—Robert J. Popovics
Attorney, Agent, or Firm—Morgan & Finnegan, L.L.P.

[57] ABSTRACT

The invention relates to a method for recirculating the heavier solution from the separation part of liquid—liquid extraction to the mixing unit of the same extraction step, so that part of the recirculated solution is returned to the mixing unit from the overflow of the discharge end of the separation part. An essential feature of the invention is that the major part of the heavier solution recirculated into the mixing unit is obtained from the separation part proper, along the whole width thereof. The invention also relates to an apparatus based on said method, in which apparatus, in the bottom part of the settler (6) there is located a heavier solution collecting channel (13) extending over the whole width of the settler and being provided with suction pipes (15) which are oriented in an inclined fashion towards the solution to be collected from the channel.

14 Claims, 4 Drawing Sheets

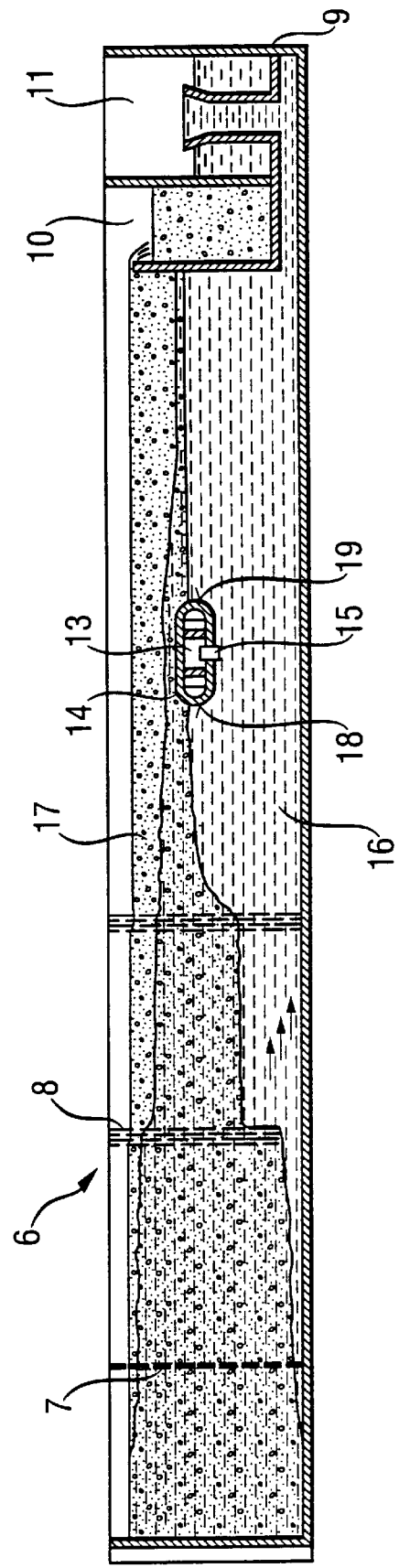

METHOD AND APPARATUS FOR RECIRCULATING A HEAVIER SOLUTION FROM THE SEPARATION PART OF TWO SEPARABLE SOLUTIONS INTO A MIXING UNIT

BACKGROUND OF THE INVENTION

The present invention relates to a method for recirculating the heavier solution in liquid—liquid extraction in between the solution separation part and mixing unit in a process where two unmixed solutions are first mixed and then the solutions are separated. The invention also relates to a collecting channel whereby the circulation of the heavier solution is realized. By means of the method and apparatus of the invention, the aqueous solution is gathered evenly also from a wide separation part, so that it does not disturb the proceeding of the extraction solutions flowing in the separation part. Another object of the invention is, by means of controlled circulation, to intensify the bottom flow in the longitudinal direction of the separation part and thus even out the vertical flows in this space.

When separating metals from each other, one of the employed separation methods is liquid—liquid extraction, where the heavier solution generally is an aqueous solution, and the lighter solution is an organic solution, such as kerosene, to which some suitable extraction chemical is dissolved. In large extraction plants, such as copper extraction plants, flow control is particularly important, even to an extent where it may prove to be a restricting factor as for the size of the plant in question.

Internal recirculation of solutions from the separation parts of single extraction steps back to the mixing unit of the same extraction step is very common, because the recirculation is part of the improving process of the solution-solution contact in the mixing tank. An equal quantity of both solutions is needed in the mixing tanks in order to achieve a desired solution contact, drop size and contact area. A desired solution contact indicates as to which solution is present in drops and which as a continuous solution. The mutual quantity of the solutions also affects the nominal viscosity of the dispersion. When the external supply of one of the solutions into the mixing tank is not sufficient, said solution is obtained into the circulation from the separation part. This situation concerns for example all solution contact steps of copper extraction, but particularly the washing step and the copper re-extraction step. For example in the washing of the extraction solution, the extraction solution flow can be 1,000–2,000 $m^3/h$, when the external basic solution feed is only of the order 10–50 $m^3/h$, i.e. in this case the internal recirculation need of the aqueous solution is nearly equal to the feed.

According to conventional practice, the internal solution circulation is obtained from chutes located at the discharge end of the separation part, to which chutes the purified solution is gathered as overflow. Especially when recirculation is large and the external solution supply small, it is difficult to make changes in the solution circulation quantities. It is particularly difficult to drive up a plant. There is no more solution to be used in recirculation than what is in the collecting chute and what is obtained as overflow. When for instance the circulation volume of the aqueous solution is increased, water runs up in the chute, and the desired circulation rate is obtained only gradually, as the external solution supply brings in more aqueous solution. This is due to the fact that an increase in the water supply increases the share of aqueous solutions in the mixing unit, and therefore respectively displaces organic solution. Thus the aqueous solution conducted into the mixing unit does not re-enter the circulation of the separation part, but the supply of aqueous solution is stopped for a long time. This leads to serious trouble in a process situation where it would be important to wash the extraction solution of difficult impurities; in copper extraction, these are, among others, chlorides, manganese and iron.

BRIEF SUMMARY OF THE INVENTION

The above described drawback is eliminated according to the present invention by arranging in the separation part, i.e. in the settler, at least one collecting channel, which extends over the whole width of the separation part. Into this collecting channel, there is conducted the major part of the required heavier solution, i.e. of the aqueous solution, directly from the separation part proper, and only a small part from the discharge end, and the aqueous solution to be recirculated is conducted into the mixing unit. Thus the aqueous solution quantity needed in the mixing unit can be supplied irrespective of external feed or the scarcity of aqueous solution in the discharge end of the separation part. In the vertical direction, the collecting channel is advantageously located in the aqueous solution space of the separation part, i.e. in the bottom part of the settler. The top surface of the collecting channel can be located at the bottom surface of the lighter solution, i.e. of the organic solution, or at the bottom of the separation part. The aqueous solution is absorbed into the channel by means of suction pipes attached thereto. The essential novel features of the invention are apparent from the appended claims.

BRIEF DESCRIPTION OF THE DRAWINGS

The invention is described in more detail with reference to the appended drawings, where FIG. 4 is a side-view illustration of the settler.

DETAILED DESCRIPTION OF THE INVENTION

Figure 1:
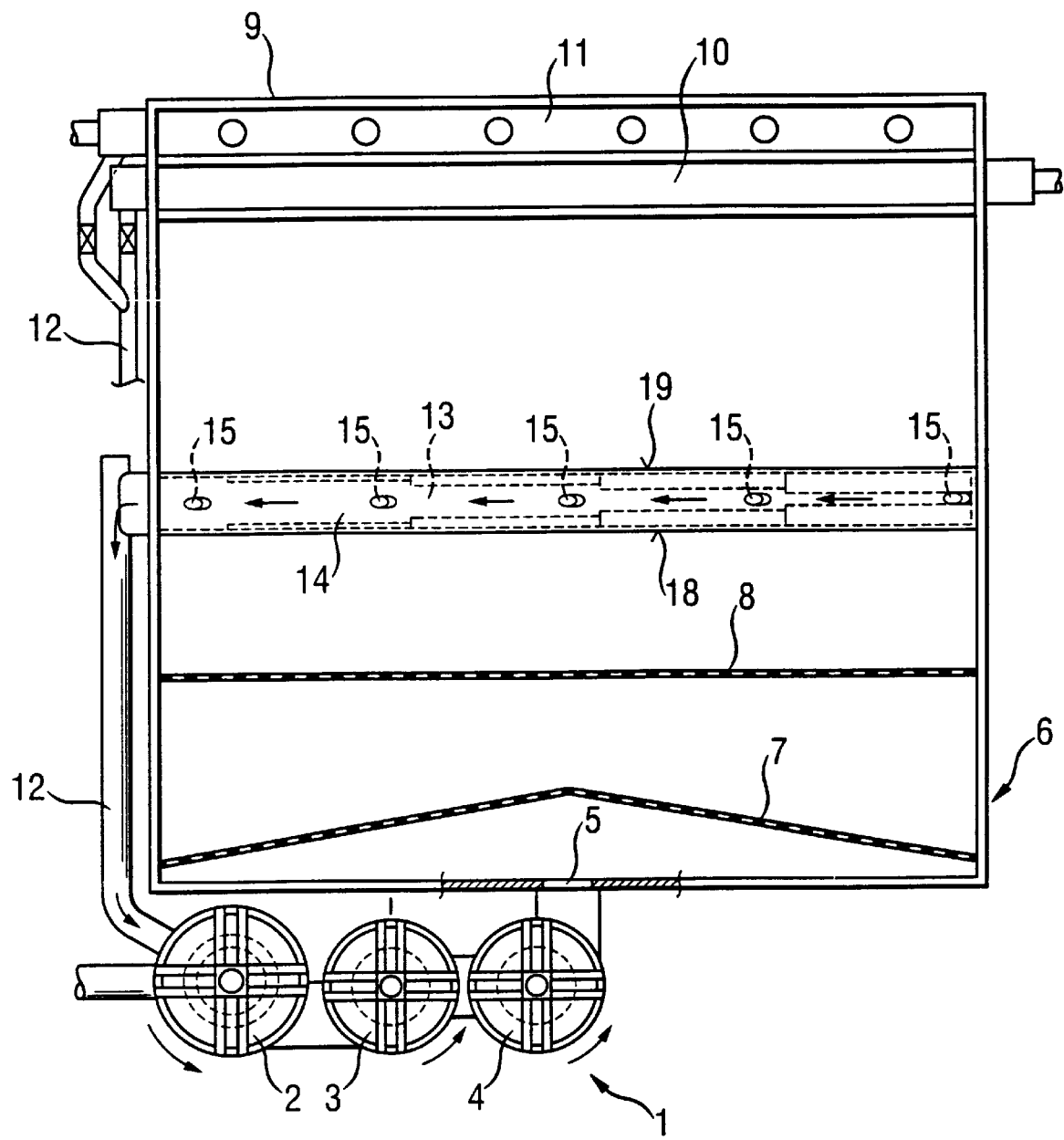
FIG. 1 is a top-view illustration of the mixing and separation parts belonging to the extraction step.

In a situation according to FIG. 1, the mixing unit 1 of the extraction step comprises a pump unit 2 and two mixers 3 and 4, and from the last mixer in the flowing direction there is discharged a controllably mixed two-phase dispersion through an aperture 5 into the separation part, i.e. into the settler 6. The front end of the settler is advantageously provided with several picket fences 7 and 8, and at the final end 9 of the settler there is installed both an organic phase overflow chute 10, provided with recirculation pipes (not illustrated in the drawing) and a water end 11 of the aqueous phase, provided with recirculation pipes 12. In the settler, there is arranged a collecting channel 13 extending over the whole width of the settler, which collecting channel is connected to the aqueous solution circulation pipe 12. When seen in the longitudinal direction of the settler, the collecting channel is located in between the last picket fence 8 and the organic phase collecting chute 10. The collecting channel 13 is encased in a channel casing 14. The number of the recirculation pipes 12 can be one or several; in the latter case, the construction of oversized pipes can be avoided.

Figure 2:
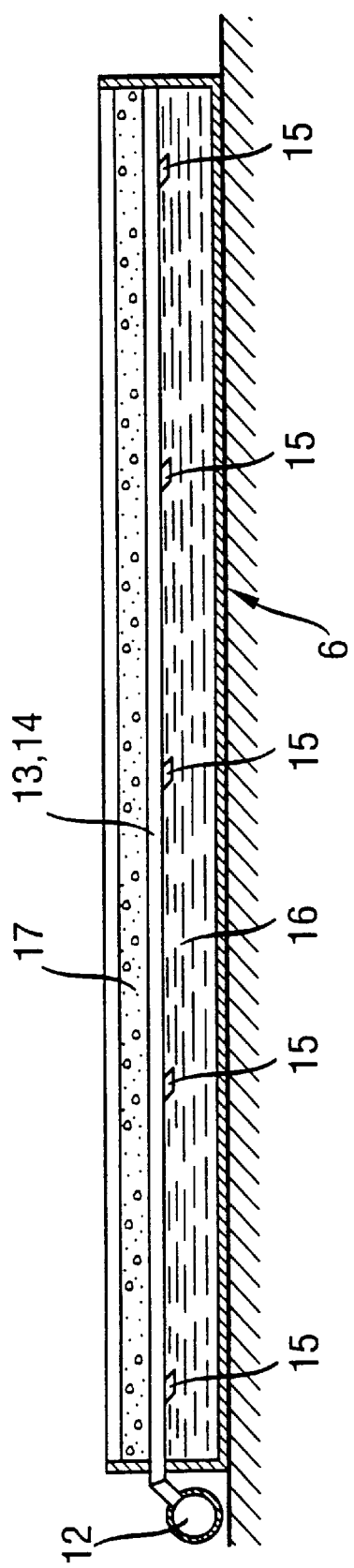
FIG. 2 shows a cross-section of the settler at the channel structure.

As is seen in FIG. 2, the collecting channel 13 is mainly formed of a tubular element placed inside the aqueous solution layer and provided with suction pipes 15 that are directed downwards in an inclined fashion and are open at both ends. In addition to the fact that the collecting channel can be supported inside the aqueous solution layer, as was described above, it can also be embedded in the settler bottom structure, in which case the pipes absorbing the aqueous solution are directed upwards in an inclined fashion. Thus the suction pipes are always oriented from the collecting channel 13 towards the aqueous solution 16 to be collected.

In the prior art it is not known to absorb the aqueous solution directly from the settler space, but only from the discharge end, because it has been supposed that the suction of the aqueous solution from the settler space confuses both the phase separation and particularly the smooth proceeding of the aqueous solution towards the discharge end. In the present invention we have now found out what kind of channel structure is needed for absorbing a virtually equal amount of solution from the different suction pipes. The essential point is that the channel is designed throughout for a roughly equal flow speed, which is for instance 0.4–1.2 m/s, and advantageously 0.6–0.9 m/s. An equal flow speed throughout the whole channel also means roughly equal pressure losses at different spots of the channel, also as regards the suction spots. In order to achieve a roughly equal pressure loss at all spots of the collecting channel 13, the channel is designed so that it expands gradually prior to each suction pipe 15, when proceeding towards the settler edge on the side of the circulation pipe 12, as is seen in FIG. 1. Thus the flowing direction of the solution proceeding in the channel 13 is the one indicated by an arrow in FIG. 1, i.e. transversal with respect to the flowing direction of the settler solutions.

An even flow speed also applies to single suction pipes 15, which extend from the vicinity of the separation part for a certain length to inside the flow channel itself. Moreover, the pipes rise at about an angle of 45° towards the collecting channel 13, and the orientation of the rise is in the flowing direction of the channel, as is seen in FIG. 2. Inside the channel, the pipe ends are cut horizontally, so that the pipe orifices offer an enlarged elliptical contact surface with the channel flows.

Figure 3:
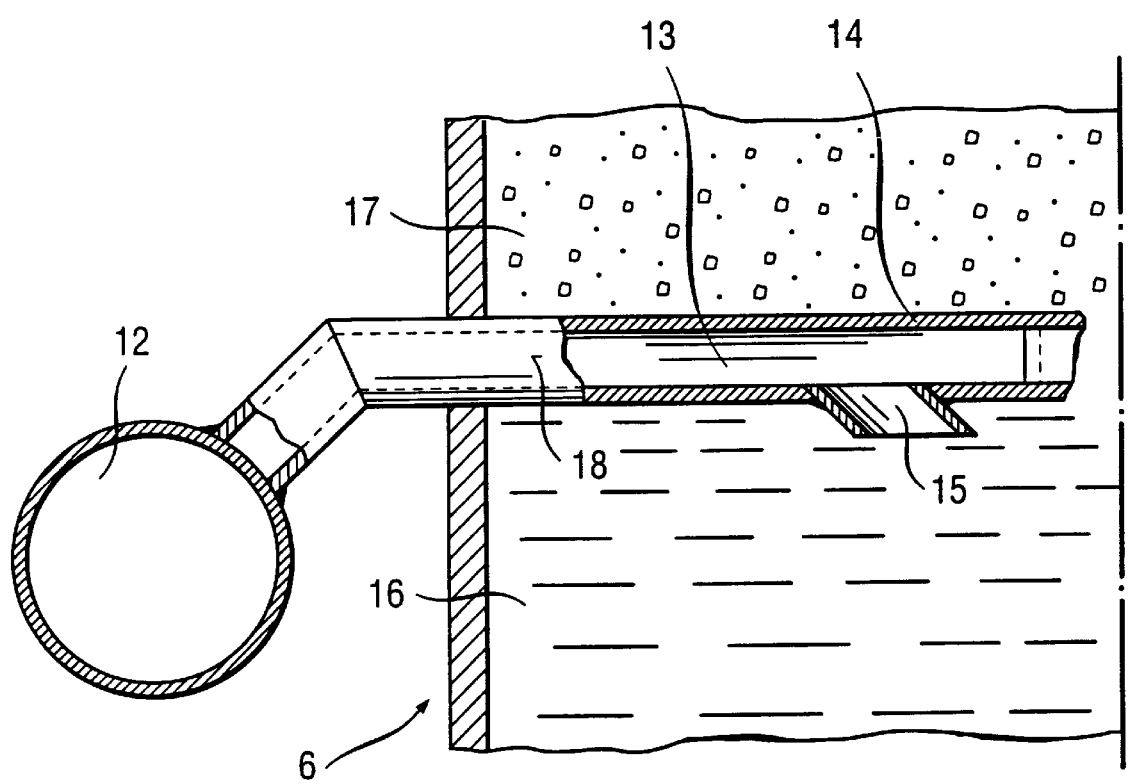
FIG. 3 is a partial cross-section of the channel according to the invention.

By practical experiments we have found a certain channel structure, but it does not, however, leave out other similar arrangements following the described principle. As is seen in FIG. 3, the suction pipe 15 enters the channel 13 for a length that is 0.1–0.4 times the channel height and advantageously 0.2–0.3 times the channel height. When the channel 13 is observed in the flowing direction thereof (towards the circulation pipe 12), the channel expands gradually so that each expanding spot is located in the channel somewhat before the next suction pipe 15. As the channel in this fashion expands prior to the input of the next pipe end, and particularly as this expansion is symmetrical with respect to the channel center, and the suction pipes are located on the center line of the channel, the channel flow is made to strongly sweep over the input spots, at the same time as there is made room for incoming solution quantities. This structure also helps the input suctions to be distributed evenly between the separate suction pipes.

A prerequisite for the aqueous solution circulation according to the invention as well as for the advantages offered thereby is an even suction extending over the width of the separation part. In this respect, the structure of the collecting channel 13 is essential, as was already maintained. The number of single suction pipes in the collecting channel can be varied depending on the width of the separation part, but advantageously the number of suction pipes is at least three, generally 3–7.

The detailed structure of the channel casing 14 may also vary, but if the channel 13 together with the casing 14 are installed in a aqueous solution space 16 underneath the layer of the organic phase 17, it is advantageous to design the channel casing 14 so that its sides 18 and 19 parallel to the settler flow are formed to be curved, advantageously semispherical, as is illustrated in FIG. 4. The width/height ratio of the casing is advantageously between 2 and 8, and the higher the internal recirculation need of the aqueous solution, the higher the ratio. The essentially semispherical sides are advantageous both from the point of view of strength and flow. The curved shape of the surface arranged particularly against the settler flow directs the organic entrainment fog upwards and thus helps the small drops mechanically rise to their own solution phase. As for the curvature of the discharge end, it prevents the formation of excessive discharge turbulences, which could cause excessive turbulence in the vicinity of the boundary surface and thus lead to a new formation of drops in the organic phase.

The arrangement according to the invention offers a possibility to flexibly and with swift changes circulate all the various aqueous solution quantities that are required in the process, because the whole water quantity contained in the large separation part is available. It is particularly advantageous to use the method and apparatus according to the invention in connection with a separation part that is deeper than usual, in which case the separation part is designed so that when conventionally the ratio of the layer thicknesses of the organic and aqueous solutions at the final end of the separation part is of the order 1:1.5, it is at least 1:2.0, even 1:4 when a deeper separation part is employed. Said structure smoothes out vertical flows in the separation part, i.e. the bottom flows in the separation part are intensified.

This is realized simply so that aqueous solution is absorbed into the collecting channel in the vicinity of the bottom, which makes new water flow to replace it along the bottom from the front end of the separation part, i.e. the settler. An additional advantage is that in the space successive to the collecting channel, the aqueous solution flowing into the final end of the settler is additionally delayed, so that the organic phase drops have more time to rise to their own layer. As for the removal of the aqueous solution from the duct located against the bottom, from underneath the organic phase collecting chute 10, as a uniform flow 11 extending over the whole separation part—it suitably smoothes out the vertical flows in the final end of the separation part.

We have chosen the above described channel structure, because thus it is possible to achieve a self-regulating operation from the point of view of suction smoothness. When the channel flow is intensified, it draws along more of the pipe content, i.e. it intensifies the pipe flow. To some extent this also works in the other way, so that an intensified pipe flow lightens and increases the channel flow.

In FIG. 3 it can also be seen how a channel, after a possible bend, is connected to the circulation pipe 12, which leads to the pump unit 2 of said extraction step. While the pump unit sucks aqueous solution from the collecting channel 13 of the separation part, and not from the discharge chute 11 leading to the next process step, there is also achieved the remarkable advantage that the return flow from the pump in connection with driving down or during a power failure does not conduct the organic solution back along a path that leads to the next process step. This is particularly important as for the copper re-extraction step, where said route leads to electrowinning. Because an organic solution in the electrolytic electrical precipitation of copper could cause serious trouble in the process, the circulation practice according to the present invention ensures an undisturbed copper production as regards this aspect.

In the above specification, we have described the method and apparatus according to the invention mainly with reference to copper extraction in large extraction plants and tried to find solutions for the problems arising in them. It is, however, obvious that the method and apparatus can be applied to other extraction plants, too.

The invention is further described with reference to the appended example:

EXAMPLE

In order to design a collecting channel, there were performed two measurement experiments in order to find such conditions where both the flow speed of the aqueous solution and the pressure loss would remain as even as possible throughout the passage in the channel. Measuring principles used in the planning of air ducts were applied in the work. In the experiments, there was employed a collecting channel provided with five suction pipes, and thus the collecting channel itself was also formed of five parts, the tranversal surface area of each part was larger than the preceding part when seen in the flowing direction. Both experiments are represented in percentages, so that the area of the last collecting channel part is always 100%. In the first experiment, the diameter of the suction pipe was maintained constant, but in the second experiment also the diameter of the two last suction pipes was altered, because it was found out that a more even distribution in the flow quantities was thus achieved. The results are given in the table below.

|  |  |  | Channel area |  |  |  |  | Deviation % |
|---|---|---|---|---|---|---|---|---|
|  |  | % | 20.5 | 38.6 | 56.6 | 75.9 | 100 |  |
| Experiment 1 | Suction pipe ø | % | 100 | 100 | 100 | 100 | 100 |  |
|  | Flow from pipe | % | 74.9 | 64.4 | 89.9 | 123.2 | 100 | 25 |
| Experiment 2 | Suction pipe ø | % | 100 | 100 | 100 | 80 | 85 |  |
|  | Flow from pipe | % | 74.8 | 87.2 | 96.6 | 70.2 | 100 | 15 |

As is seen from the experiments, in order to achieve a solution flow that is even and roughly equal in volume throughout the length of the channel, it is often necessary, in order to adjust the transversal area of the channel, to partly adjust the transversal area of the suction pipes as well. Most ideal the situation is when the quantity of solution flowing from each pipe is roughly the same, i.e. the deviation is as small as possible.

What is claimed is:

1. A method of recirculating the heavier solution phase of two different solution phases, one being heavier and the other lighter, of a liquid—liquid extraction process from a separation zone of said extraction process to a mixing zone of said extraction process comprising: (a) passing dispersed and settled solutions through at least one picket fence forming a restricted transversal surface in said separation zone; (b) obtaining a part of said heavier solution phase for recirculation to the mixing zone from that portion of said separation zone between a last picket fence and a discharge point of said lighter solution phase and extending along an entire width of said separation zone; and (c) returning from an upper discharge point of the separation zone a part of the lighter phase solution to the mixing zone.

2. A method according to claim 1, wherein the heavier solution is obtained from the bottom of the separation part.

3. A method according to claim 1, wherein the liquid—liquid extraction is copper extraction.

4. An apparatus for effecting liquid—liquid extraction of two solution phases, one being heavier than the other, comprising a settler separator, a mixer, a pump unit, and recirculation system wherein said settler separator has: (i) a picket fence at a front end of said settler; (ii) a collecting channel at a bottom part of said settler and extending across said settler; (iii) suction pipes inclined from said channel towards a liquid solution; (iv) a discharge end having an overflow chute for said lighter solution phase; (v) a discharge chute for said heavier solution phase; and (vi) a circulation passage from said settler to said mixer.

5. An apparatus according to claim 1, wherein the collecting channel is located in between the last picket fence of the settler and the overflow chute of the organic solution.

6. An apparatus according to claim 1, wherein the collecting channel is located in the settler, in the heavier solution layer underneath the organic solution layer, and that the suction pipes are directed downwards in an inclined fashion.

7. An apparatus according to claim 1, wherein the collecting channel is located in the bottom structure of the settler, so that the suction pipes are directed upwards in an inclined fashion.

8. An apparatus according to claim 1, wherein the transversal surface area of the collecting channel expands gradually in the flowing direction of the channel, according to the number of the suction pipes.

9. An apparatus according to claim 1, wherein the number of the suction pipes is 3–7.

10. An apparatus according to claim 1, wherein the suction pipes are attached in the collecting channel in the direction of the channel flow.

11. An apparatus according to claim 1, wherein the suction pipes enter the collecting channel for a length which is 0.1–0.4 times the channel height.

12. An apparatus according to claim 1, wherein the ends of the suction pipes are cut horizontally inside the collecting channel.

13. An apparatus according to claim 1, wherein the collecting channel is encased in a channel encasing.

14. An apparatus according to claim 13, wherein the sides of the channel casing that are parallel to the settler flow are designed to be curved.

* * * * *

UNITED STATES PATENT AND TRADEMARK OFFICE
CERTIFICATE OF CORRECTION

ATENT NO.    :    6,083,400

DATED        :    July 4, 2000

INVENTOR(S) :    BROR NYMAN et al.

It is certified that error appears in the above-identified patent and that said Letters Patent is hereby corrected as shown below:

```
Column 6, claims 5-13, line 1 of each, after "claim"
change "1" to --4--.
```

Signed and Sealed this

Twenty-fourth Day of April, 2001

Attest:

NICHOLAS P. GODICI

*Attesting Officer*  *Acting Director of the United States Patent and Trademark Office*